United States Patent
Rajpara et al.

(10) Patent No.: US 7,791,347 B2
(45) Date of Patent: Sep. 7, 2010

(54) BATTERY ASSEMBLY WITH ENHANCED PROPERTIES

(75) Inventors: Janak Rajpara, Yorba Linda, CA (US); Michael Shaw, Upland, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 1299 days.

(21) Appl. No.: 10/991,798

(22) Filed: Nov. 18, 2004

(65) Prior Publication Data
US 2009/0325044 A1    Dec. 31, 2009

Related U.S. Application Data

(60) Provisional application No. 60/523,171, filed on Nov. 18, 2003.

(51) Int. Cl.
| | |
|---|---|
| *G01N 27/416* | (2006.01) |
| *G01R 19/00* | (2006.01) |
| *G01R 23/02* | (2006.01) |
| *G01R 31/36* | (2006.01) |
| *H01M 10/48* | (2006.01) |
| *H01M 10/34* | (2006.01) |
| *H01M 10/52* | (2006.01) |

(52) U.S. Cl. ............... 324/426; 324/76.11; 324/76.39; 324/117 H; 324/433; 429/90; 429/61; 429/122; 702/63

(58) Field of Classification Search ............. 429/122, 429/90, 60; 702/63; 324/426, 76.11, 76.39, 324/117 H, 433
See application file for complete search history.

(56) References Cited

U.S. PATENT DOCUMENTS

| | | | | | |
|---|---|---|---|---|---|
| 4,947,123 | A | * | 8/1990 | Minezawa | 324/427 |
| 5,321,347 | A | * | 6/1994 | Chien | 320/139 |
| 6,162,559 | A | * | 12/2000 | Vutetakis et al. | 429/100 |
| 6,304,059 | B1 | * | 10/2001 | Chalasani et al. | 320/118 |
| 6,549,014 | B1 | * | 4/2003 | Kutkut et al. | 324/426 |

OTHER PUBLICATIONS

U.S. Appl. No. 29/217,399, filed Nov. 16, 2004.
"Primer on Lead-Acid Storage Batteries, DOE Handbook, U.S. Department of Energy, Washington, D.C.", Sep. 1995, accessed from www.eh.doe.gov/techstds/standard/hdbk1084/hdbk1084.pdf, Feb. 24, 2005.

(Continued)

*Primary Examiner*—Patrick Ryan
*Assistant Examiner*—Helen O Conley
(74) *Attorney, Agent, or Firm*—K&L Gates LLP

(57) ABSTRACT

A battery assembly for use in an aircraft. The battery assembly may include a battery and a circuit configured to monitor the battery in situ. The circuit may include at least one sensor positioned to sense at least one property of the battery and a processor in communication with the sensor. The battery assembly may also include a battery housing, wherein the battery and the circuit are positioned within the battery housing. A method for evaluating a battery in an electric device. The method may include collecting operational information from the battery. The operational information may be collected without removing the battery from the electric device. The method may also include comparing the operational information to a degradation routine describing a property of the battery and calculating a capacity of the battery.

11 Claims, 7 Drawing Sheets

OTHER PUBLICATIONS

"3515 and 3156 Ratiometric Linear Hall-Effect Sensors for High-Temperature Operation", accessed from http://www.allegromicro.com/sf/3515/, Feb. 24, 2005.

"Battery Performance Characteristics—How to specify and test a battery", accessed from http://www.mpoweruk.com/performance.htm, Nov. 16, 2004.

"Some Technical Details on Lead Acid Batteries", accessed from http://www.flex.com/~kalepa/technotes.htm, Nov. 12, 2004.

Serway, "Magnetic Fields", Physics for Scientists and Engineeers with Modern Physics, Third Edition, Updated Version, 1990, Chapter 29, pp. 822-825.

Horowitz, et al., "Vacuum gauges", The Art of Electronics, Second Edition, 1989, Chapter 15, p. 1007.

* cited by examiner

BATTERY ASSEMBLY WITH ENHANCED PROPERTIES

CROSS-REFERENCE TO RELATED APPLICATION

This application claims priority under 35 U.S.C. §119(e) to U.S. Patent Application Ser. No. 60/523,171 filed on Nov. 18, 2003, which is incorporated herein by reference.

BACKGROUND

Batteries today are used in a variety of applications by a variety of electric devices. For example, most aircraft require batteries to power both starter motors and auxiliary devices such as lights, avionics, etc. Traditional automobiles also require batteries for similar purposes. Even some modern automobiles, such as, for example, gas-electric hybrid and fuel cell automobiles rely on batteries to provide electric power for locomotion. These and other electric devices may use various kinds of batteries including, for example, lead acid batteries, nickel cadmium batteries, etc.

What is lacking in the art, however, is the capability to determine the capacity and remaining charge of a battery without removing the battery from its electric device. Accordingly, there is a need for a battery assembly including a circuit or smart chip for monitoring the battery. Also, there is a need for methods of monitoring the capacity and remaining charge of a battery as well as methods for predicting premature battery failure.

SUMMARY OF THE INVENTION

One embodiment of the present invention relates to a battery assembly for use in an aircraft. The battery assembly may include a battery and a circuit configured to monitor the battery in situ. The circuit may include at least one sensor positioned to sense at least one property of the battery and a processor in communication with the sensor. The battery assembly may also include a battery housing, wherein the battery and the circuit are positioned within the battery housing.

Another embodiment of the present invention relates to a method for evaluating a battery in an electric device. The method may include collecting operational information from the battery. The operational information may be collected without removing the battery from the electric device. The method may also include comparing the operational information to a degradation routine describing a property of the battery and calculating a capacity of the battery.

Another embodiment of the present invention relates to a method for evaluating a battery. The method may include finding an indicator of the battery's age and deriving a first value of a first discharge function factor from a discharge function describing the battery. The deriving may be based on the indicator. The method may also include calculating a capacity of the battery, wherein the calculating is based on the first value.

Another embodiment of the present invention relates to a method for evaluating a battery. The method may include sensing a voltage of the battery and monitoring fluctuations in the rate of change of the voltage. The method may also include comparing the fluctuations to at least one voltage decay profile for the battery and determining a remaining charge of the battery based on the comparing.

Unless otherwise indicated, all numbers expressing quantities of electrical values, time, temperatures and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

In various embodiments, the present apparatus, assemblies, devices methods and systems may be used in an aviation setting to comply with Federal Aviation Administration (FAA) requirements. For example, aspects of the present invention may be used to comply with FAA's requirement that the capacity of aircraft batteries be checked at periodic intervals. It is also envisioned that the present apparatus, methods and systems may be used in any other setting in which a battery is desirable.

Figure 1A:
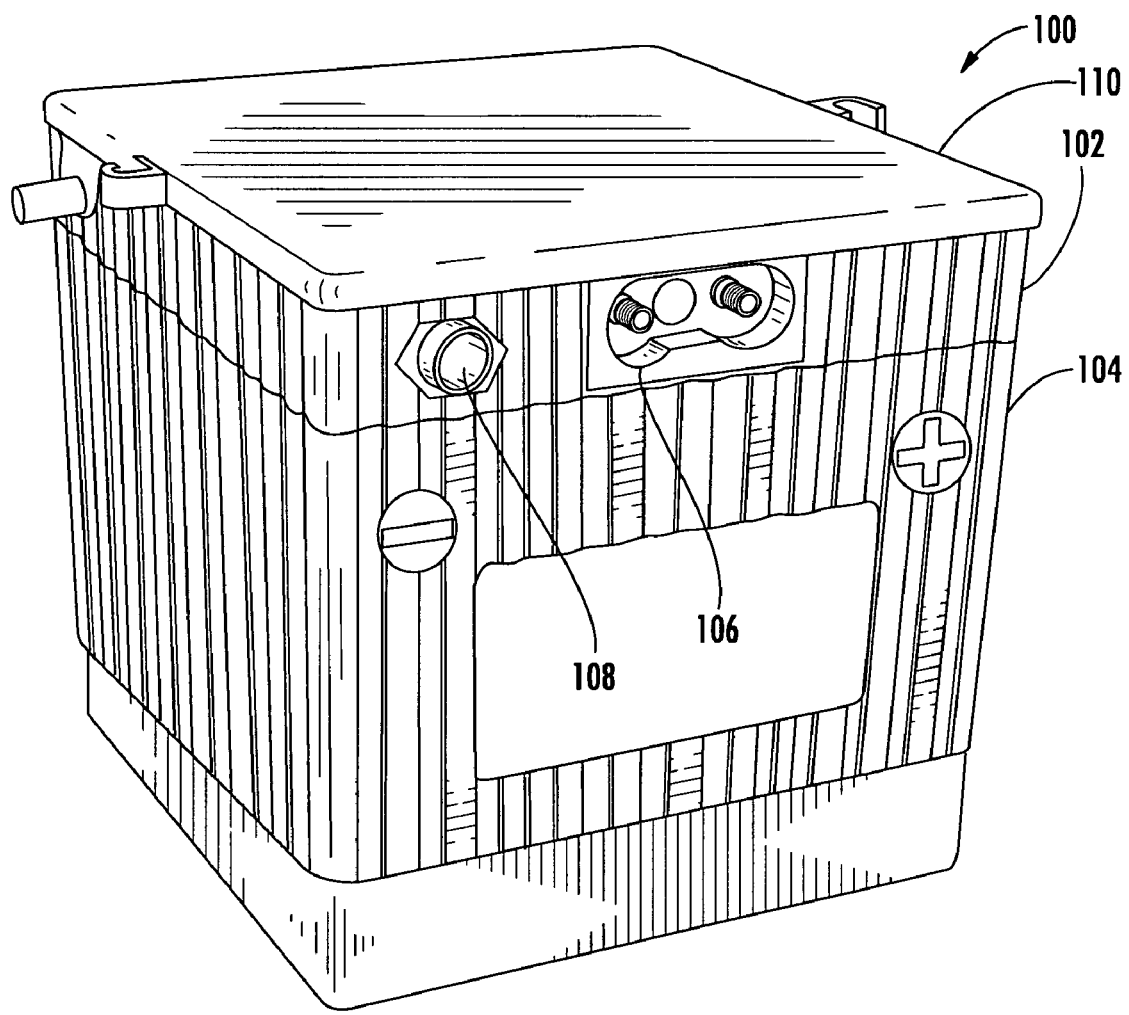
FIG. 1A is a front view of a battery assembly according to various embodiments.

FIG. 1A shows a battery assembly 100 according to various embodiments of the present invention. The battery assembly 100 may include a case 104, a cover 102 and a lid 110. A battery and monitoring circuit (not shown) may be housed within the assembly 100. Terminal pins 106 may facilitate an electrical connection between the battery assembly 100 and a load to be powered by the battery. Also, data port 108 may provide an electrical connection to the battery monitoring circuit.

The battery assembly 100 may be adapted for use in various electric devices in a variety of applications. For example, the battery assembly 100 may be used in aviation applications as a starter battery or an auxiliary battery. When the battery assembly 100 is used in aviation applications, terminal pins 106 may be connected to an aircraft using quick-disconnect connectors, for example those made by REBLING and/or CANNON. In other various embodiments, the battery assembly 100 may be used in automotive applications as either a starter battery or an auxiliary battery. It is envisioned that the battery assembly 100, as well other embodiments of the apparatus and methods of the present invention, can be adapted to any application requiring the use of a battery, and may incorporate any kind of battery including, for example, a lead acid battery, a nickel cadmium battery, an alkaline battery, etc.

Figure 1B:
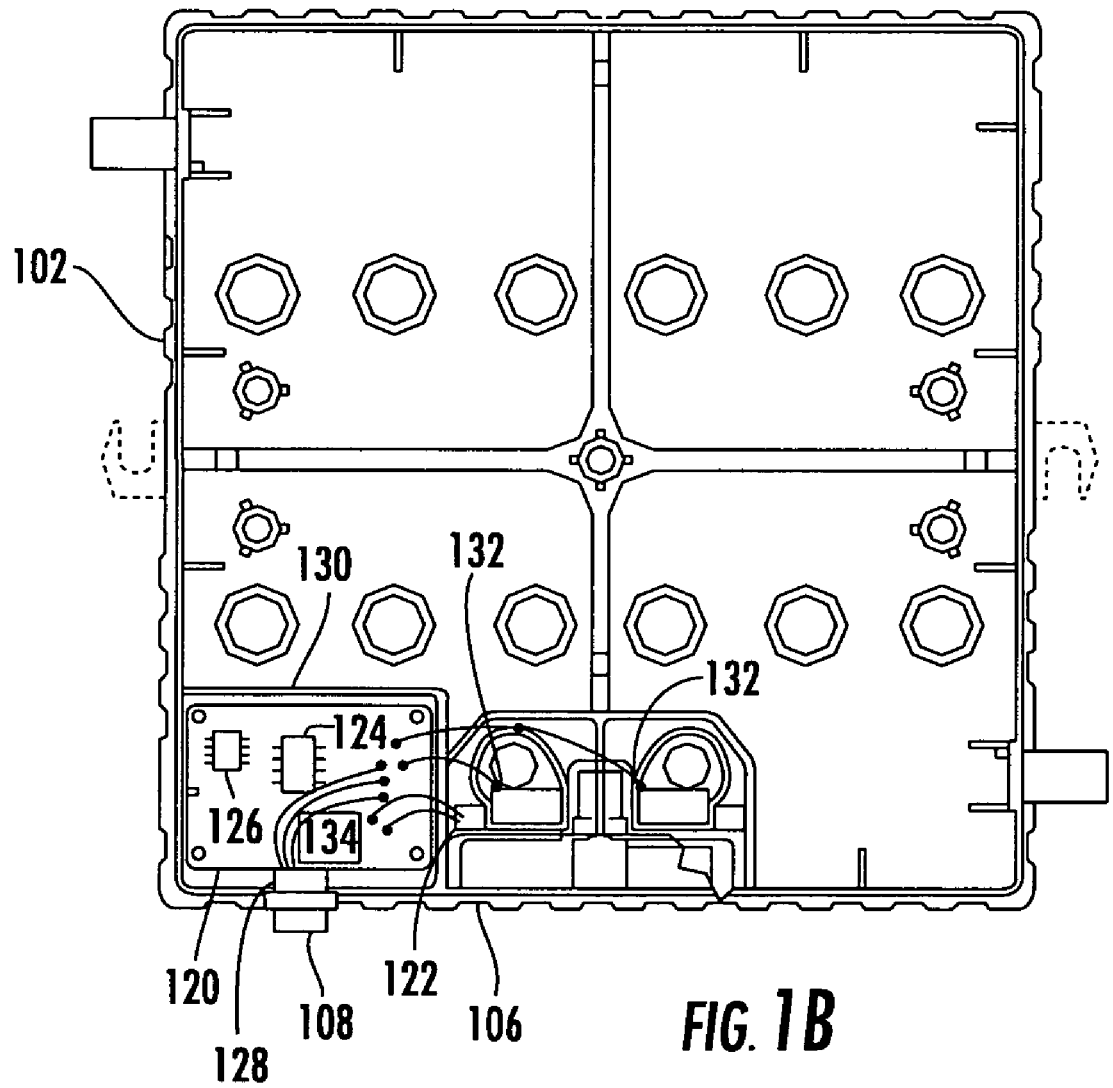
FIG. 1B is a top view of a portion of a battery assembly according to various embodiments.

FIG. 1B shows an interior view of the cover 102 of the battery assembly 100 according to various embodiments. Terminal pins 106 are shown in the lower central area of the cover 102. An inset 130 in the cover 102 may house a battery monitoring circuit 120. The battery monitoring circuit 120 may include a processor 124 and memory 126. Data port 108 may be electrically connected to the battery monitoring circuit 120 and may protrude through the cover 102 of the battery assembly through aperture 128.

The battery monitoring circuit 120 may be electrically connected to one or more sensors 122, 132, and 134. The sensors 122, 132 and 134 may sense properties of the battery. Sensors 132 may sense a voltage across the terminal pins 106. Sensor 122 may sense a current delivered through the terminal pins 106. In various embodiments, sensor 122 may be a Hall effect sensor and may be placed parallel to the axis of the terminal pins 106. Sensor 134 may sense the temperature of the battery. The sensor 134 may be mounted on the battery monitoring circuit 120 as shown or in other various embodiments may be mounted at other locations within the battery assembly 100.

In various embodiments the portion of the cover 102 including the circuit 120, sensors 122, 132, 134 and other components may be potted with a filling material to prevent damage due to heat or other elements. The filling material may be any suitable material known in the art, for example, epoxy.

Figure 2:
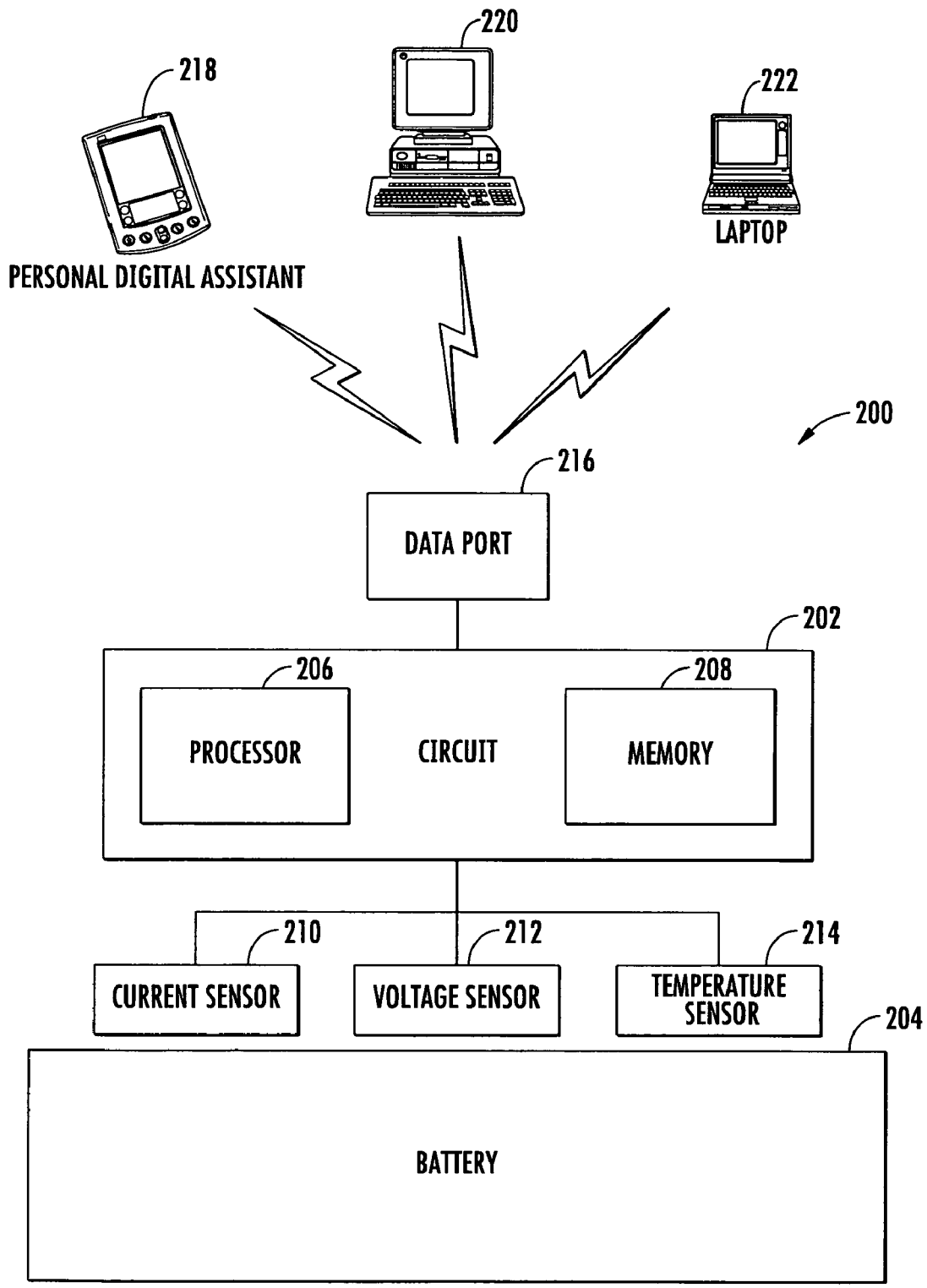
FIG. 2 is a block diagram of a system for monitoring a battery according to various embodiments.

FIG. 2 shows a block diagram of a system 200 for monitoring a battery 204 according to various embodiments. The system 200 may include a battery monitoring circuit 202 or smart chip. The battery monitoring circuit 202 may include a processor 206 and memory 208. The battery monitoring circuit 202 may also include various sensors including, for example, a current sensor 210, a voltage sensor 212 and a temperature sensor 214. The circuit 202 may also include a data port 216. The data port 216 may allow the circuit 202 to communicate with various external processing devices 218, 220, 222. Communication between the data port 216 and the external processing devices 218, 220, 222 may be configured according to any acceptable wired or wireless protocol including, for example, a serial communication protocol, such as the USB protocol, a parallel communication protocol, a wireless communication protocol such as the BLUETOOTH protocol, etc. The external processing devices may include, for example, a personal digital assistant 218, a personal computer 220, a laptop computer 222, or other functionally suitable devices.

In various embodiments, the system 200 may collect and analyze operational data or information from the battery 204, e.g., current, voltage, temperature, etc. For example, operational data may be collected from sensors 210, 212, 214 and stored at memory 208. The processor 206 may perform analysis of the operational data. In various embodiments, the circuit 202 may monitor the life stage of the battery, e.g., the number of starts and/or cycles as discussed below.

Additional data storage and analysis may be performed by external processing devices 218, 220, 222. In various embodiments, circuit 202, including processor 206 and memory 208, may gather and store operational data that may be uploaded to one or more external processing devices 218, 220, 222 for analysis. Also, in various embodiments, operational information may be gathered, stored and analyzed in situ, without removing the battery 204 from its electric device.

Analysis of the operational data, by processor 206 or one or more external processing devices 218, 220, 222, may yield information about the state of the battery 204 including, for example, the number of starts that the battery 204 has performed, the number of charge/discharge cycles that the battery 204 has gone through, the capacity of the battery 204, whether the battery 204 is near failure, and other like information.

In various embodiments, the circuit 202 may also be in communication with an instrument panel 224 of the electric device. For example, if the electric device is an aircraft or automobile, the instrument panel 224 may be in a cockpit or driver seating area. The circuit 202 may provide the instrument panel 224 with, for example, any of the capacity, charge and premature failure data described herein.

In various embodiments, the system 200 may provide information regarding the capacity of a battery. A battery's capacity, expressed in Amp-hours (Ah), for example, may be a measure of the current that the battery is capable of delivering and the discharge time over which the battery is capable of delivering it. The discharge time may be the time over which the battery is capable of delivering a current before the battery voltage drops below a predetermined level. For example, a battery cell providing 2 volts may be considered discharged when its voltage drops below 1.67 volts while under load. Referring back to capacity, a battery with a capacity of 3 Ah may deliver 1 Amp over a discharge time of three hours, 3 Amps over a discharge time of one hour, etc. In various embodiments, the capacity of a battery may be expressed as the hours of discharge at a given current, or the current that the battery can support over a given discharge time.

In various embodiments, the capacity of a battery may be modeled according to a degradation routine such as a discharge function. A discharge function may mathematically express the various chemical and electrical factors affecting the battery's capacity. Batteries with different chemical and electrical configurations may have different discharge functions. For example, the capacity of some lead acid batteries may be expressed by the Peukert equation as follows:

$$I^n t = K \quad (1)$$

where I is the current delivered by the battery; t is the time over which the current may be delivered during discharge; and n and K are constants over similar ranges of discharge conditions. The factors n and K may be referred to as discharge function factors and may be dependent on the battery's age as described below.

A battery's age may be expressed in a variety of forms, for example, the number of charge and recharge cycles that the battery has gone through in its lifetime. The age of a battery may also be expressed as a number of starts. Each start may refer to one instance where the battery has delivered a very high load, such as, for example, starting an internal combustion engine. In various embodiments, an equivalency may be developed to express a given number of starts that degrade the battery similar to an equivalent number of cycles. In various embodiments, the circuit 202 of the system 200 may sense the number of starts that battery provides and derive the battery's age as an equivalent number of cycles.

Figure 3:
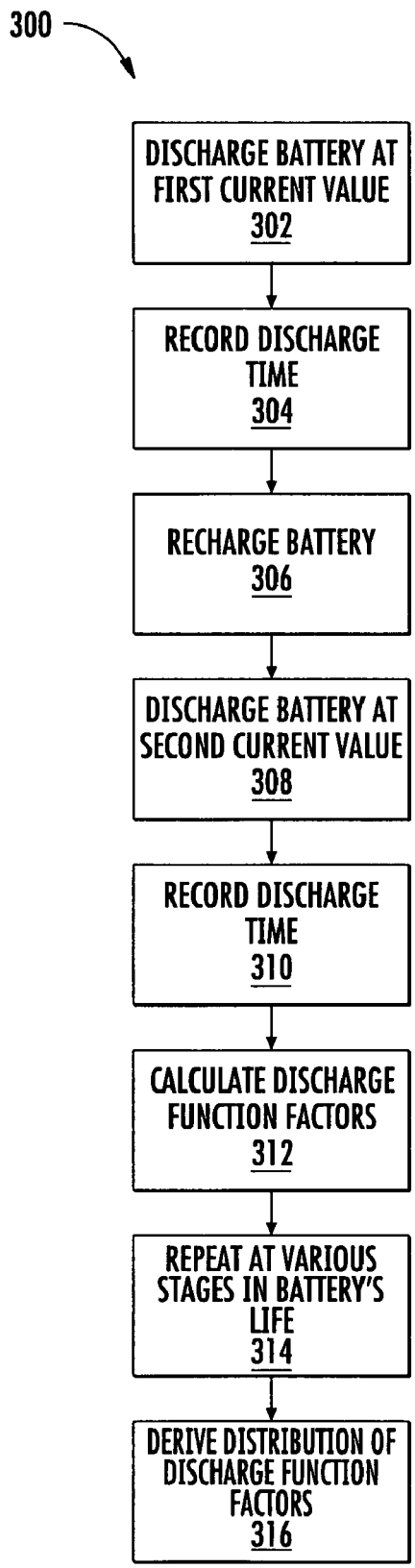
FIG. 3 is a flow chart of a method for monitoring a battery according to various embodiments.

FIG. 3 shows a flowchart of a process flow 300 for developing a model of a battery's discharge function considering the battery's age according to various embodiments. At step 302, the battery may be discharged at a first current value when the battery is at a first stage of its life. A first discharge time representing the time required to discharge the battery at the first current value may be recorded at step 304. At step 306, the battery may be recharged. The battery may be discharged again at step 308, though at a second current value. A second discharge time representing the time required to discharge the battery at the second current value may be recorded at step 310. In various embodiments, the discharging of steps 302 and 308 may be carried out in consecutive cycles of the battery to insure that the measurements at steps 304 and 310, as nearly as possible, are taken at the same point of the battery's life.

At step 312, discharge equation factors may be calculated for the first stage of the battery's life. For example, if the discharge function of the battery is described by the Peukert equation, shown above in Equation 1, then the values for K and n may be found by inserting the first current and the first discharge time into one instance of Equation 1, inserting the second current and the second discharge time into a second instance of Equation 1 and then solving for K and n using the set of two independent equations.

The process flow 300 may show the steps necessary to model a battery, such as, for example, a lead acid battery, described by the Peukert equation, or another function having two factors depending on battery age. It will be appreciated that certain steps may be omitted and/or added to the process flow 300 when different batteries having different discharge functions are modeled depending, for example, on the number of discharge function factors.

At step 314, the steps 302-312 may be repeated at various stages of the battery's life. This may yield data representing the discharge function of the battery, and values for the factors of the discharge function, at different stages in the battery's life. At step 316 distributions of discharge function factors may be found as a function of the battery's age. In various embodiments, the distributions may take the form of look-up tables showing the values of the discharge function factors corresponding to battery age, for example, a given number of battery cycles. In various other embodiments, the distributions may be expressions of the discharge function factors as a function of battery age. The expressions may be derived by any suitable method including, for example, linear regression, partial least squares, etc.

Figure 4:
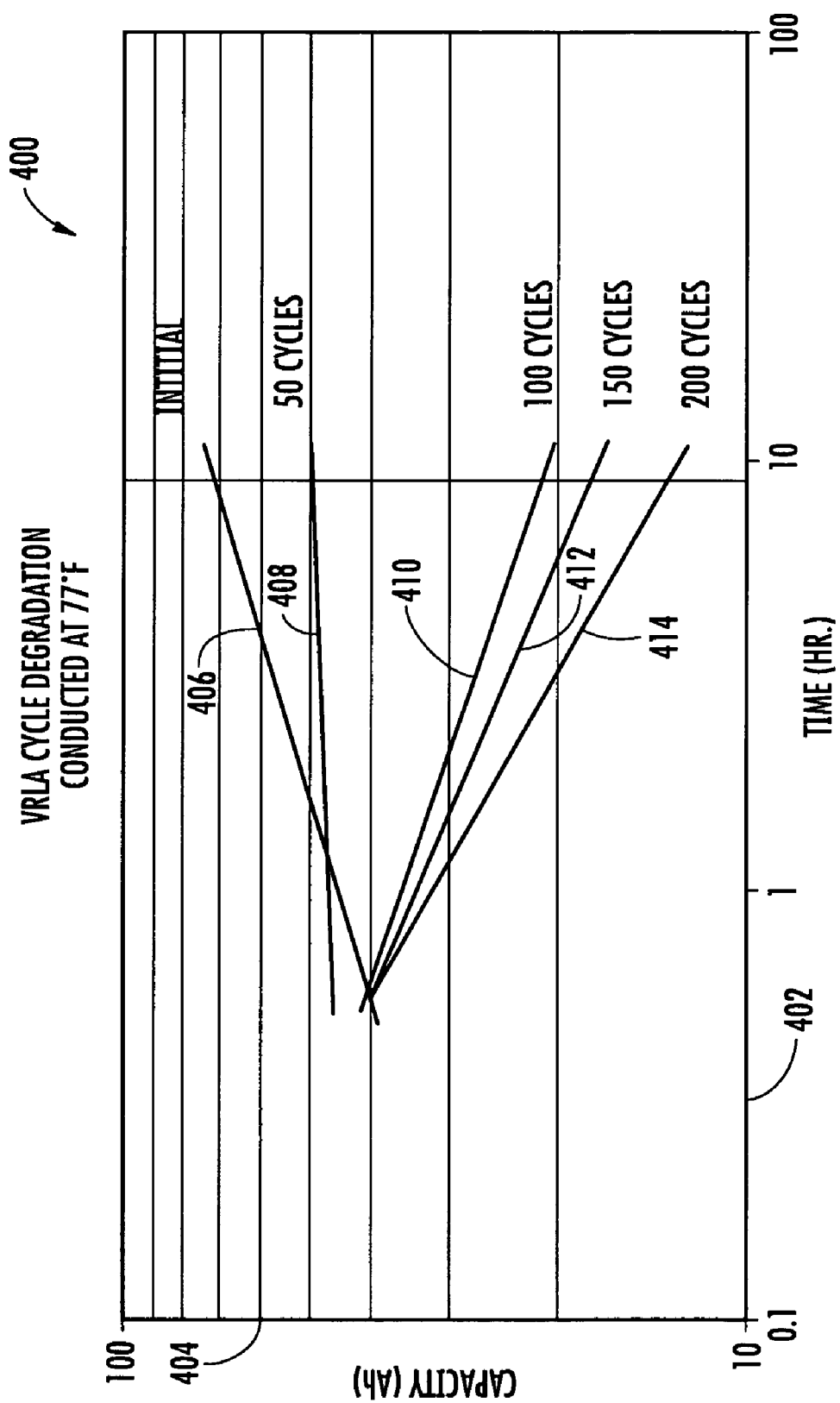
FIG. 4 is a chart of discharge functions of a battery according to various embodiments.

FIG. 4 shows a chart 400 of an example of the discharge function of a valve regulated lead acid battery at different stages of its life according to various embodiments. The chart 400 is a log-log chart as is known in the art. The discharge functions show discharge rate (axis 404) as a function of discharge time (axis 402). The curves 406, 408, 410, 412 show the discharge function of the battery at various stages of its life. For example, curve 406 shows the discharge function of the battery at zero cycles, curve 408 at 100 cycles, etc. Chart 400 may demonstrate the change in a battery's discharge function over its life.

Figure 5:
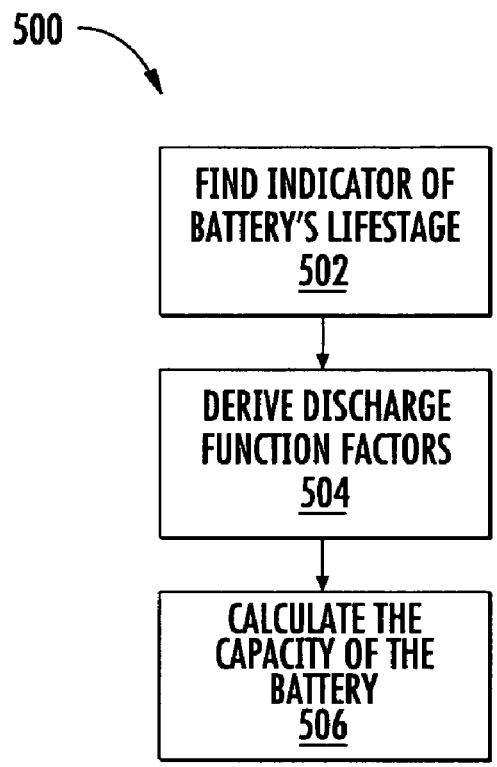
FIG. 5 is a flow chart of a method for monitoring a battery according to various embodiments.

FIG. 5 shows a flowchart of a process flow 500 for finding a battery's capacity according to various embodiments. At step 502, an indicator of the battery's age may be found. The indicator may be, for example, a number of cycles, a number of starts, etc. At step 504, discharge function factors for the battery may be derived based on the indicator of the battery's age. For example, the discharge function factors may be derived with the use of a look-up table showing values for discharge function factors at different battery ages. In various embodiments, the discharge function factors may be derived using a mathematical expression describing the factors as a function of battery age.

If, for example, the battery is a lead-acid battery whose discharge function may be described by Equation 1 above, then the discharge function factors may be K and n as described above. It can be appreciated that other kinds of batteries described by other discharge functions may require the derivation of different discharge function factors.

At step 506, the capacity of the battery may be calculated, for example, using the discharge function describing the battery and the discharge function factors found at step 504. For example, if the battery is a lead-acid battery whose discharge function is described by Equation 1 above, then the discharge function factors K and n may be used. The capacity of the battery may, in various embodiments, be expressed in Amphours, as the discharge time at a particular current level, or as the one-hour rate.

In certain situations, it may be desirable to find a second reading of a battery's remaining charge in addition to or instead of a reading derived from battery's capacity. For example, a battery may fail prematurely before the time predicted by its capacity if, for example, it has a defect or has been subjected to an abnormal load. Monitoring a battery's voltage decay under load over time may provide a second reading of the battery's remaining charge according to various embodiments. The battery's voltage decay under load may be compared to various degradation routines in the form of voltage decay profiles. In various embodiments, the system 200 may monitor a battery's voltage decay under load exclusively.

Figure 6:
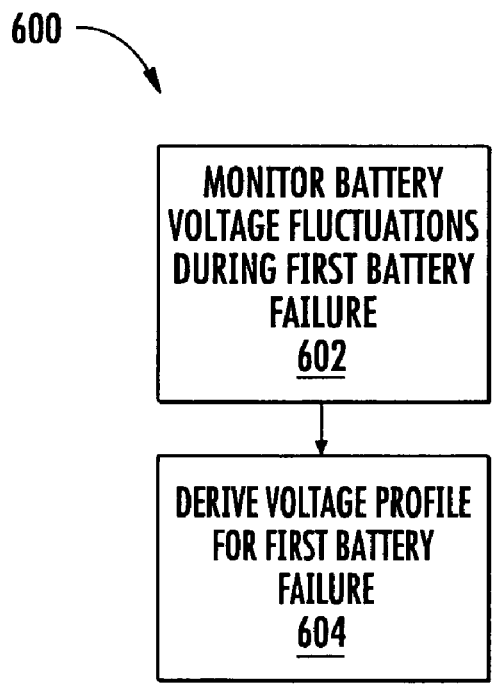
FIG. 6 is a flow chart of a method for monitoring a battery according to various embodiments.

FIG. 6 shows a flowchart of a process flow 600 for developing a voltage decay profile of a battery according to various embodiments. At step 602, battery voltage fluctuations may be monitored during a first failure of the battery. In various embodiments, fluctuations in the rate of change of battery voltage may be particularly monitored. The first failure of the battery may be, for example, a premature failure due to a defect in the battery, the result of the battery reaching the end of its charge, etc. At step 604, a voltage decay profile of the first failure may be derived. It can be appreciated that the steps 602 and 604 may be repeated to derive voltage decay profiles for a variety of different battery failures, for example, caused by a variety of different factors.

Figure 7:
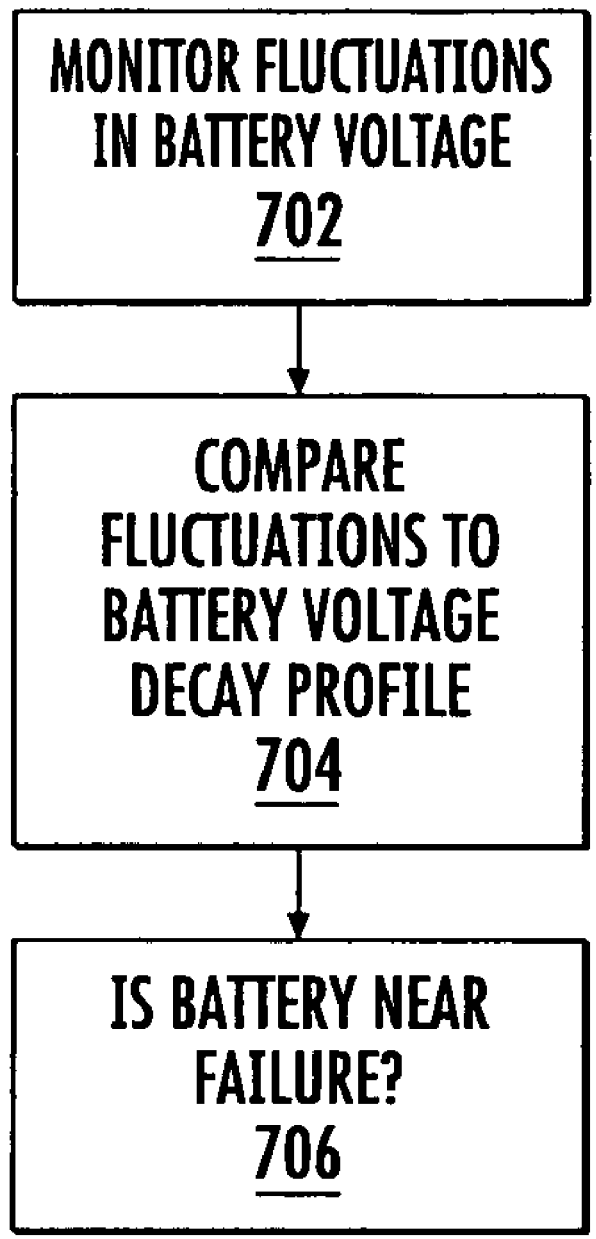
FIG. 7 is a flow chart of a method for monitoring a battery according to various embodiments.

FIG. 7 shows a flowchart of a process flow 700 for determining the remaining charge of a battery according to various embodiments. At step 702, fluctuations in battery voltage may be monitored. The fluctuations may be compared to one or more voltage decay profiles at step 704. Based on the comparison, it may be determined whether the battery is near a failure at step 706.

One skilled in the art will appreciate that the capacity and/or remaining charge of a battery may be affected by the battery's temperature. For example, if the experimental data describing discharge function factors in terms of the battery's age, e.g., as shown in FIG. 3, or the derivation of voltage decay profiles as shown in FIG. 6 were taken at a first temperature, then they may not accurately describe a battery operating at a second temperature. Accordingly, the circuit 202 and/or the external processing devices 218, 220, 222 may correct the capacity or the voltage decay profiles for effects due to temperature.

The benefits of the present apparatus, methods and systems are readily apparent to those skilled in the art. The various embodiments described herein may provide representations of the capacity, the remaining charge, or the likelihood of failure of a battery. Various portions and components of various embodiments of the present invention, for example processes to be executed by circuit 202 or external processing devices 218, 220, 222 may be implemented in computer software code using any suitable language, for example, Visual Basic, C, C++, or assembly language using, for example, standard or object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A system for use with an aircraft battery assembly, the system comprising:
    a valve-regulated lead-acid battery;
    a monitoring circuit configured to monitor the battery in situ, the monitoring circuit comprising:
        at least one sensor positioned to sense at least one property of the battery, wherein the at least one sensor comprises a Hall effect sensor positioned in parallel to the axis of a terminal of the battery to sense a current delivered by the battery;
        a processor in communication with the sensor; and
        an electronic memory in communication with the processor, wherein the memory comprises instructions that, when executed by the processor, cause the monitoring circuit configured to:
            receive operational data from the sensor;
            store the operational data at the electronic memory;
    a battery housing, wherein the battery and the monitoring circuit are positioned within the battery housing; and
        based at least on the operational data, derive an indicator of the battery's age selected from the group consisting of a number of starts and a number of charge/discharge cycles; and
    an external processing device in electronic communication with the monitoring circuit, wherein the external processing device is configured to:
        derive discharge function factors of the battery considering an age of the battery, wherein the age of the battery is derived from the operational data; and
        calculate a capacity of the battery considering a discharge function of the battery and the discharge function factors.

2. The system of claim 1, wherein the at least one sensor includes at least one of a current sensor, a voltage sensor, and a temperature sensor.

3. The system of claim 1, wherein the at least one sensor is positioned proximate to a terminal pin of the battery.

4. The system of claim 1, wherein the processor is configured to calculate a capacity of the battery based on at least one property of the battery.

5. The system of claim 1, further comprising a data port in communication with the processor, wherein the data port is configured to connect to the external processing device.

6. The system of claim 5, further comprising a quick-disconnect connector in communication with the data port.

7. The system of claim 5, wherein the external processing device is at least one of a personal digital assistant, a personal computer and a laptop computer.

8. The system of claim 1, wherein the circuit is positioned in an inset between a cover of the battery housing and a lid of the battery housing.

9. The system of claim 8, wherein the inset is adjacent to an aperture in the battery housing.

10. The system of claim 9, further comprising a data port positioned in the aperture.

11. The system of claim 1, wherein the memory further comprises instructions that, when executed by the processor, cause the monitoring circuit configured to:
    monitor a voltage decay of the battery under load;
    compare the voltage decay of the battery under load to a first voltage decay profile of a battery failure; and
    when the voltage decay profile of the battery under load matches the first voltage decay profile to a predetermined degree, indicate that the battery is near failure.

* * * * *